United States Patent
Sawjani

(10) Patent No.: US 11,511,214 B2
(45) Date of Patent: Nov. 29, 2022

(54) METHOD FOR CLEANING FUEL OIL FOR A DIESEL ENGINE

(71) Applicant: ALFA LAVAL CORPORATE AB, Lund (SE)

(72) Inventor: Mitul Sawjani, Stockholm (SE)

(73) Assignee: ALFA LAVAL CORPORATE AB, Lund (SE)

( * ) Notice: Subject to any disclaimer, the term of this patent is extended or adjusted under 35 U.S.C. 154(b) by 808 days.

(21) Appl. No.: 16/330,584

(22) PCT Filed: Aug. 17, 2017

(86) PCT No.: PCT/EP2017/070866
§ 371 (c)(1),
(2) Date: Mar. 5, 2019

(87) PCT Pub. No.: WO2018/046275
PCT Pub. Date: Mar. 15, 2018

(65) Prior Publication Data
US 2021/0275943 A1    Sep. 9, 2021

(30) Foreign Application Priority Data

Sep. 6, 2016  (EP) ..................................... 16187321

(51) Int. Cl.
*B01D 17/12* (2006.01)
*B01D 17/02* (2006.01)
(Continued)

(52) U.S. Cl.
CPC ......... *B01D 17/12* (2013.01); *B01D 17/0217* (2013.01); *B04B 5/12* (2013.01);
(Continued)

(58) Field of Classification Search
CPC ......... B01D 17/12; B01D 17/02; B04B 11/02; B04B 5/12; C10G 31/10
See application file for complete search history.

(56) References Cited

U.S. PATENT DOCUMENTS 3,013,961 A    12/1961   Hemfort et al.
3,494,544 A    2/1970    Thylefors
(Continued)

FOREIGN PATENT DOCUMENTS

CA    1314490 C      3/1993
CN    104379706 A    2/2015
(Continued)

OTHER PUBLICATIONS

International Search Report, issued in PCT/EP2017/070866, dated Sep. 8, 2017.
(Continued)

*Primary Examiner* — Youngsul Jeong
(74) *Attorney, Agent, or Firm* — Birch, Stewart, Kolasch & Birch, LLP

(57) ABSTRACT

A method for cleaning fuel oil for a diesel engine includes providing a fuel oil to be cleaned, supplying said fuel oil to be cleaned to a centrifugal separator, and cleaning said fuel oil in the centrifugal separator to provide a clean oil phase. The method further includes measuring the viscosity of the fuel oil to be cleaned before cleaning in said centrifugal separator or the viscosity of the clean oil phase, and regulating the temperature of the fuel oil to be cleaned based on said measured viscosity.

19 Claims, 4 Drawing Sheets

(51) Int. Cl.
  *B04B 5/12* (2006.01)
  *B04B 11/02* (2006.01)
  *C10G 31/10* (2006.01)

(52) U.S. Cl.
  CPC .............. *B04B 11/02* (2013.01); *C10G 31/10* (2013.01); *B04B 2005/125* (2013.01)

(56) References Cited

U.S. PATENT DOCUMENTS

| | | | |
|---|---|---|---|
| 4,151,950 | A | 5/1979 | Gunnewig |
| 4,840,612 | A | 6/1989 | Pallmar |
| 6,521,120 | B1 | 2/2003 | Grimwood |
| 2003/0078152 | A1 | 4/2003 | Fischer et al. |
| 2014/0057772 | A1 | 2/2014 | Mackel et al. |
| 2014/0249011 | A1* | 9/2014 | Mense .................. C10G 1/002 494/13 |
| 2015/0191660 | A1 | 7/2015 | Englund |
| 2016/0122661 | A1 | 5/2016 | Mackel et al. |

FOREIGN PATENT DOCUMENTS

| | | |
|---|---|---|
| CN | 105051160 A | 11/2015 |
| DE | 20 2010 000 137 U1 | 5/2010 |
| EP | 2 181 744 A1 | 5/2010 |
| JP | 55-123351 A | 9/1980 |
| JP | 1-33664 B2 | 7/1989 |
| JP | 2009-179741 A | 8/2009 |
| JP | 2014-31788 A | 2/2014 |
| JP | 2015-522677 A | 8/2015 |
| JP | 2016-33368 A | 3/2016 |
| JP | 2016-509075 A | 3/2016 |
| JP | 5965062 B2 | 8/2016 |
| RU | 2 033 274 C1 | 4/1995 |
| RU | 2 196 805 C1 | 1/2003 |
| WO | WO 2015/063017 A1 | 5/2015 |

OTHER PUBLICATIONS

Written Opinion of the International Searching Authority, issued in PCT/EP2017/070866, dated Sep. 8, 2017.
English translation of Russian Office Action and Search Report for Russian Application No. 2019109046/05, dated July 4, 2019.
ANDERSON et el., "Fuels from Waste," Academic Press, Aug. 31, 1984, pp. 96-100 (total 6 pages).
Encyclopedia of Chemical Terminology Editoriai Committee, "Encyclopedia of Chemical Terminology," Chemical Industry Press, Feb. 28, 1997, p. 306 (total 2 pages).
English translations of the Chinese Office Action and Search Report, dated Jul. 13, 2021, for Chinese Application No. 201780054390.2.
Mei et al., "New Energy Industry Status and Developing Prospect," Guangdong Economy Publishing House, May 29, 2015, pp. 102-104 (total 4 pages).
English translation of Japanese Notice of Reasons for Rejection, dated Dec. 23, 2019, for Japanese Application No. 2019-512671.
English translation for RU-2196805-C1, Published Jan. 20, 2003.
Chinese Office Action and Search Report for Chinese Application 201780054390.2 dated Aug. 12, 2020.
"Centrifugation: Factory Operation Series No. 12," Kagaku Kogyosha, May 15, 1968, 5 pages total.
"Fuel/Lubrioation Oil Terminology Dictionary," Seizando-Shoten Publishing Co., Ltd., Jan. 28, 1994, 10 pages total.
"Handbook of Hydraulic Machinery" Corona Publishing Co., Ltd., Sep. 20, 1968, 4 pages total.
"Investigative Research Pertaining to Fuel Oil Used in Domestic Vessels," Maritime Credit Corporation, Mar. 1992, 4 pages total.
"Maritime Logistics Professional mobile application," Maritime Logistics Professional, Jun. 17, 2022, 2 pages total, URL: https://www.maritimeprofessional.com/pages/app.
"Petroleum products—Fuels (class F) Specifications of marine fuels," ISO, Aug. 15, 2012, 3 pages total.
"Structure and Operation of Oil Cleaning Machine," Marine Technical College, Mar. 17, 2006, 87 pages total.
English translation of the Japanese Notice of Opposition Board Members for Opposition No. 2022-700553 (Patent No. 6987128), dated Jul. 27, 2022.
English translation of the Japanese Notice of Opposition No. for Patent No. 6987128, dated Jun. 29, 2022.
Fonseca, "Separate Cat Fines More Effectively," Maritime Logistics Professional, Jun. 17, 2022, 2 pages total, URL: https://www.maritimeprofessional.com/news/separate-fines-more-effectively-261982.
Japanese Delivery Notice of Duplicate of Opposition Documents for Opposition No. 2022-700553 (Patent No. 6987128), dated Aug. 19, 2022, with an English translation.
Japanese Explanation of Exhibits for Patent Opposition Case Against Japanese Patent No. 6987128, dated Jun. 22, 2022, with an English translation.
Muto, "Fuel Oil Separators Selection and Actual Operation," The Marine Engineering Society in Japan, vol. 33, No. 6, Jun. 1, 1998, 11 pages total.
Nomura, "Introductory Course on Ship Fuel (2)—Significance and Testing Methods of Various Properties of Ship Fuel," The Marine Engineering Society in Japan, vol. 30, No. 4, Apr. 1, 1995, 11 pages total.
Shiode, "Trends in Ship Fuel Oil Standards," The Marine Engineering Society in Japan, vol. 33, No. 6, Jun. 1, 1998, 9 pages total.

* cited by examiner

METHOD FOR CLEANING FUEL OIL FOR A DIESEL ENGINE

FIELD OF THE INVENTION

The present invention relates to the field of cleaning fuel oil, such as cleaning fuel oil on board a ship, and more specifically to cleaning fuel oil using a centrifugal separator.

BACKGROUND OF THE INVENTION

Centrifugal separators are generally used for separation of liquids and/or solids from a liquid mixture or a gas mixture. During operation, fluid mixture that is about to be separated is introduced into a rotating bowl and due to the centrifugal forces, heavy particles or denser liquid, such as water, accumulates at the periphery of the rotating bowl whereas less dense liquid accumulates closer to the central axis of rotation. This allows for collection of the separated fractions, e.g. by means of different outlets arranged at the periphery and close to the rotational axis, respectively.

Fuel oil for diesel engines on board ships and in power stations contains particles of silicon and aluminium compounds (e.g. microporous aluminium silicates or alumino-silicates known as zeolites), called catalyst fines. Catalyst fines are residues from the refining process of crude oil known as catalytic cracking, wherein long hydrocarbon molecules are cracked into shorter molecules. These particles are undesired in the fuel oil since they are abrasive and may cause wear in the engine and auxiliary equipment. When processing fuel oil to be used as fuel for a diesel engine on a ship, the concentration of such catalyst fines in the oil is decreased during centrifugal separation so that the oil to be used complies with environmental regulations, such as with ISO 8217.

The cleaning temperature of fuel oil is usually about 98° C. Higher temperatures may be used in order to increase the separation efficiency so that the removal of harmful particles such as catalytic fines is increased. However, when separating at temperatures above 98° C., the wear and deterioration of centrifugal separator parts are accelerated.

Thus, there is a need in the art for methods that allow separation of fuel oils at high temperature, such as at a temperature above 98° C., while decreasing the risk of wear on the centrifugal separator.

SUMMARY OF THE INVENTION

A main object of the present invention is to provide a method for cleaning fuel oil for a diesel engine that enables separation at high temperature and with a decreased wear and deterioration of centrifugal separator parts.

A further object is to provide a system for cleaning fuel oil for a diesel engine that allows for separation at high temperature.

As a first aspect of the invention, there is provided a method for cleaning fuel oil for a diesel engine comprising the steps of providing a fuel oil to be cleaned;
supplying the fuel oil to be cleaned to a centrifugal separator;
cleaning the fuel oil in the centrifugal separator to provide a clean oil phase; characterized in that the method further comprises the steps of
measuring the viscosity of the fuel oil to be cleaned before cleaning in the centrifugal separator or the viscosity of the clean oil phase, and
regulating the temperature of the fuel oil to be cleaned based on the measured viscosity.

The term "fuel oil for a diesel engine" refers herein to oil intended for use in an engine for the generation of power, such as in an engine on board a ship or in a power plant. The term "fuel oil" may be as defined in ISO 8217, Petroleum products—Fuels (class F)—Specification of marine fuels, editions 2005 and 2012, or an oil component/phase originating from the pre-treatment of such an oil before use in an engine on board a ship or in a power plant. A fuel oil may be obtained as a fraction from petroleum distillation, either as a distillate or as a residue. Diesel is regarded as a fuel oil herein. The fuel oil may thus be marine (residual) fuel oil (MFO) or Bunker C oil.

The "fuel oil to be cleaned" may be composed of different types of fuel oils having different viscosities, generally stored in a tank, which means that the type of fuel oil that is sent to the separator for cleaning may differ in time.

In embodiments, the fuel oil for a diesel engine comprises heavy fuel oil (HFO). HFO is a residue oil from distillation or from cracking in mineral oil processing.

The method may be a method for on-board processing of the fuel oil, i.e. a method that is used on-board a ship.

The centrifugal separator may be for separation of at least two components of a fluid mixture, such as a liquid mixture, which are of different densities. The centrifugal separator may comprise a stationary frame and a drive member configured to rotate a rotating part in relation to the stationary frame. The rotating part may comprises a spindle and a centrifuge rotor enclosing a separation space, the centrifuge rotor being mounted to the spindle to rotate together with the spindle around an axis (X) of rotation. The rotating part is supported by the stationary frame by at least one bearing device. The separation space may comprise a stack of separation discs arranged centrally around the axis of rotation. Such separation discs form surface enlarging inserts in the separation space. The separation discs may have the form of a truncated cone, i.e. the stack may be a stack of frustoconical separation discs. The discs may also be axial discs arranged around the axis of rotation.

Thus, the step of supplying the fuel oil to be cleaned to a centrifugal separator may comprise supplying the fuel oil to be cleaned to the separation space of the centrifugal separator, such as via an inlet pipe leading to the separation space, from e.g. a tank for storing the fuel oil.

The steps of measuring the viscosity of the fuel oil to be cleaned before cleaning in the centrifugal separator or measuring the viscosity of the clean oil phase, and regulating the temperature of the fuel oil to be cleaned based on the measured viscosity may thus be performed during the step of supplying the fuel oil to be cleaned to a centrifugal separator, e.g. during transport from e.g. a tank to the centrifugal separator and/or during continuous separation of the fuel oil in the centrifugal separator.

The step of cleaning the fuel oil in the centrifugal separator to provide a clean oil phase may comprise separating the fuel oil to be cleaned into a clean oil phase, a sludge phase and an aqueous phase. The sludge phase may comprise solid impurities, such as catalyst fines (cat fines). Catalyst fines are residues from the refining process of crude oil known as catalytic cracking, wherein long hydrocarbon molecules are cracked into shorter molecules. These particles are undesired in the fuel oil since they are abrasive and may cause wear in the engine and auxiliary equipment. The concentration of catalyst fines in the fuel oil normally varies between 0 and 60 ppm. Catalyst fines may be in the size range from 0.1 microns (micrometres) to 100 microns.

Thus, the step of cleaning the fuel oil in the centrifugal separator may comprise separating catalyst fines from the fuel oil, i.e. decreasing the concentration of catalyst fines in the oil.

The method may further include the step of adding a separation aid to the fuel oil to be cleaned stream, i.e. upstream of the separator. Such separation aid may be a liquid separation aid, such as a polymer. Consequently, the step of cleaning may comprise separating in the separation space of the centrifugal separator the catalyst fines and the separation aid from the fuel oil by centrifugal force; discharging a clean oil phase from the separation space through a central light phase outlet thereof; and discharging separated smaller particle, such as catalyst fines, together with separated separation aid from the separation chamber through a heavy phase outlet of the separation chamber, situated radially outside the central light phase outlet.

The step of measuring the viscosity of the fuel oil to be cleaned before cleaning in the centrifugal separator or the viscosity of the clean oil phase may be performed continuously or at regular time intervals.

The step of regulating may comprise increasing and/or decreasing the temperature of the fuel oil to be cleaned, either intermittently or permanently, so that the temperature of the fuel oil to be cleaned is also increased or decreased during the actual separation of the oil in the centrifugal separator.

The first aspect of the invention is based on the insight that the measured viscosity may be used as a signal to control the heating of the fuel oil before separation. This means that the separation temperature may be adjusted to the actual viscosity of the oil to be separated or be adjusted based on information of the viscosity of the oil that has been separated. Consequently, in the method of the first aspect of the invention, the measured viscosity of the fuel makes it possible to decide when a high separation temperature, such as a temperature above 98° C., is required. This means that wear and deterioration of separator parts may be decreased since the temperature since the method allows for the high temperature to be used only when needed, i.e. when the viscosity is high.

In embodiments of the first aspect of the invention, the viscosity of the fuel oil to be cleaned is measured before cleaning in the centrifugal separator.

Thus, the viscosity may be measured on the fuel oil upstream of the separator, such as between a fuel oil tank and the separator. The viscosity may be measured e.g. downstream of a heater for heating the oil, i.e. after heating of the oil. This means that the temperature may be regulated based on the oil that is actually about to be separated.

However, the viscosity could also be measured of the oil that has been cleaned. Thus, in embodiments of the first aspect of the invention, the viscosity is measured downstream of the centrifugal separator. The viscosity could for example be measured at or after the liquid light phase outlet of the separator or in a tank downstream of the separator before the cleaned fuel oil is used in the engine.

In embodiments of the first aspect of the invention, the step of regulating the temperature of the fuel oil to be cleaned comprises changing the temperature so that the viscosity of the oil to be cleaned is kept below a specific maximum viscosity $v_{max}$.

Thus, a preset maximum viscosity $v_{max}$ may be set and the temperature may be regulated so that all fuel oil is separated at a viscosity that is lower than this preset maximum viscosity.

As an example, the specific maximum viscosity $v_{max}$ may be between 50 and 60 cSt, such as about 55 cSt.

A centistoke (cSt) is a centimeter-gram-second (CGS) unit of kinematic viscosity, equal to 1/100 (0.01) stoke, i.e. 1 cSt=1 mm$^2$/s. Centistoke is the common unit used to define the viscosity of marine fuel oils.

Furthermore, viscosity of the oil may be kept at a setpoint viscosity value $v_{set}$ that is below the specific maximum viscosity $v_{max}$, or within a specific viscosity interval that is below the specific maximum viscosity $v_{max}$.

Thus, the temperature may be regulated so that the fuel oil is cleaned at the same reference viscosity, i.e. the setpoint viscosity $v_{set}$, which may have been set prior to separation by the operator. The setpoint viscosity value $v_{set}$ may be a value between 25-45 cSt, such as about 35 cSt.

Further, the temperature may be regulated so that the viscosity is kept within a specific viscosity interval, wherein the whole interval is below the specific maximum viscosity $v_{max}$, meaning that all fuel oil is cleaned when it has a viscosity within this interval. As an example, the specific viscosity interval may be between 25-45 cSt.

In embodiments of the first aspect of the invention, the step of regulating the temperature of the fuel oil comprises comparing the measured viscosity to the setpoint viscosity value $v_{set}$ and decreasing the temperature if the measured viscosity is lower than $v_{set}$ and increasing the temperature if the measured viscosity is higher than $v_{set}$.

Furthermore, the fuel oil to be cleaned may fluctuate between at least two different fuel oils having different viscosities, and $v_{set}$ may be set as the measured viscosity of a fuel oil of the highest viscosity at a temperature $t_{set}$, wherein $t_{set}$ is above 105° C.

The fuel oil of the of the highest viscosity of the fuel oils to be cleaned may for example be an oil having a viscosity of about 700 cSt at 50° C.

The temperature $t_{set}$ may be the maximum limit temperature $t_{max}$ of the separation process in the centrifugal separator, and may depend on the type of separator used, i.e. it may depend on the type of parts etc. that are included in the separator. $t_{max}$ may be determined by the operator and may be above 105° C., such as above 110° C., such as 115° C. or above.

In embodiments of the first aspect of the invention, the step of regulating the temperature comprises regulating the temperature to temperatures above 98° C.

Thus, regulating the temperature may include regulating the temperature of the fuel oil to be cleaned to temperatures that are considered as "high temperature separation"

As an example, the temperature of the fuel oil to be cleaned may be regulated to temperatures that include temperatures above 105° C., such as above 110° C., such as above 115° C.

In embodiments of the first aspect of the invention, the step of regulating the temperature of the fuel oil to be cleaned comprises changing the temperature to values between a lowest temperature $t_{low}$ and a maximum limit temperature $t_{max}$, wherein $t_{low}$ is between 95° C. and 98° C., and $t_{max}$ is above 105° C., such as above 110° C., such as at or above 115° C.

The lowest temperature used depends on the viscosity of the fuel oil, meaning that if the viscosity of the fuel oil is very low, the lowest temperature to which the fuel oil to be cleaned is regulated may be room temperature, below room temperature, or somewhere between room temperature and for example 95 or 98° C.

In embodiments of the first aspect of the invention, the method is further comprising a step of regulating the flow rate of the fuel oil to be cleaned. Thus, also the flow rate of the fuel oil to be cleaned, in addition to the temperature, may be regulated. The flow rate may have impact on the separation efficiency. For example, a lower flow rate may be used to separate a fuel oil of higher viscosity compared to a fuel oil of lower viscosity.

The step of regulating the flow rate of the fuel oil to be cleaned may be based on the measured viscosity. It may be advantageous to regulate the flow rate before regulating the temperature.

In embodiments of the first aspect of the invention, the step of regulating the flow rate of the fuel oil to be cleaned depends on the workload of the engine in which the cleaned oil phase is used.

Thus, the step of regulating the flow rate of the fuel oil to be cleaned may thus depend on information about the engine workload, such as the fuel consumption of the engine. If the workload of the engine and e.g. the fuel consumption of the engine decreases, the flow rate of the fuel oil to be cleaned may be reduced, and if the workload of the engine and e.g. the fuel consumption of the engine increases, the flow rate of the fuel oil to be cleaned may be increased.

However, the step of regulating the flow rate of the fuel oil to be cleaned may depend on the measured concentration of catalyst fines in the cleaned oil phase and/or the measured concentration of catalyst fines in the fuel oil to be cleaned.

In embodiments of the first aspect of the invention, the step of regulating the flow rate of the fuel oil to be cleaned depends on both the workload of the engine in which the cleaned oil phase is used and at least one measured catalyst fines concentration, such as the concentration of catalyst fines in the cleaned oil phase and/or the measured concentration of catalyst fines in the fuel oil to be cleaned.

If the concentration of catalyst fines in the cleaned oil phase and/or in the fuel oil to be cleaned increases, the flow rate of the fuel oil to be cleaned may be reduced, and if the concentration of catalyst fines in the cleaned oil phase and/or in the fuel oil to be cleaned decreases, the flow rate of the fuel oil to be cleaned may be increased.

As a second aspect of the invention, there is provided a system for cleaning fuel oil for a diesel engine comprising
 a centrifugal separator for separating impurities from a fuel oil for a diesel engine and for generating a cleaned oil phase,
 at least one instrument for measuring the viscosity of the fuel oil to be cleaned or the viscosity of the cleaned oil phase,
 means for regulating the temperature of the fuel oil to be cleaned, and
 a control unit configured for receiving information of the viscosity from the at least one instrument for measuring the viscosity and further configured for generating an output signal to the means for regulating the temperature of the fuel oil to be cleaned based on the received information of the viscosity.

The terms and definitions used in relation to the second aspect are the same as discussed in relation to the first aspect above.

The centrifugal separator may thus be as discussed in relation to the first aspect above.

The at least one instrument for measuring the viscosity of the fuel oil to be cleaned or the viscosity of the cleaned oil phase may be one or several viscometers. The instrument for measuring the viscosity may thus be arranged upstream of the centrifugal separator, i.e. for measuring the viscosity of the fuel oil that is supplied to the inlet pipe of the centrifugal separator. The instrument may further, as a compliment or as an alternative, be arranged downstream of the centrifugal separator for measuring the viscosity of a cleaned oil phase The means for regulating the temperature of the fuel oil to be cleaned may comprise a heater and/or a heat exchanger.

The control unit is configured to regulate the temperature of the fuel oil to be cleaned based on information of the measured viscosity. The control unit may comprise a processor and an input/output interface for communicating with the means for regulating the temperature and for receiving information from the at least one instrument for measuring the viscosity of the fuel oil to be cleaned or the viscosity of the cleaned oil phase.

In embodiments of the second aspect of the invention, the system further comprises means for regulating the flow rate of the fuel oil to be cleaned. The control unit may further be configured for generating an output signal to the means for regulating the flow rate of the fuel oil to be cleaned.

The means for regulating the flow rate of the fuel oil to be cleaned may be or comprise a pump.

The means for regulating the flow rate of the fuel oil to be cleaned, such as a pump, may be arranged upstream of the both the at least one instrument for measuring the viscosity of the fuel oil to be cleaned and the means for regulating the temperature of the fuel oil to be cleaned.

In embodiments of the second aspect of the invention, the system further comprises a flow meter arranged downstream of the centrifugal separator for measuring the flow rate of a cleaned oil phase, and wherein the control unit is configured to regulate the flow rate of the fuel oil to be cleaned based on information from the flow meter. The flow meter may thus be arranged to measure the flow rate of cleaned oil that is entering an engine which uses the fuel oil cleaned by the system.

A flow meter arranged for measuring the flow rate of fuel entering of the engine gives information about the fuel oil consumption of the engine, and is thus a measure of the engine workload. The flow mater is arranged downstream of the centrifugal separator. The fuel entering the motor may thus originate from the clean oil phase from the separator, but may have been stored in e.g. a tank before it is used in the engine. Consequently, the system may further comprise a bunker tank or the like downstream of the centrifugal separator for storing the fuel oil to be cleaned before being supplied to the engine, and the flow meter may be arranged downstream of such a tank.

The system may further comprise a sensor for measuring the concentration of catalyst fines in the clean oil phase and/or a sensor for measuring the concentration of catalyst fines in the fuel oil to be cleaned. The control unit may thus be configured to regulate the flow rate of the fuel oil to be cleaned based on information from such a sensor or from several of such sensors. The control unit may be configured to reduce the flow rate of the fuel oil to be cleaned if it receives information that the concentration of catalyst fines in the clean oil phase and/or the fuel oil to be cleaned increases, and it may be configured to increase the flow rate of the fuel oil to be cleaned if it receives information that the concentration of catalyst fines in the clean oil phase and/or the fuel oil to be cleaned decreases.

In embodiments of the second aspect of the invention, the system comprises at least one instrument for measuring the viscosity of the fuel oil to be cleaned and the instrument is arranged downstream of the means for regulating the temperature of the fuel oil to be cleaned. Thus, the means for regulating the temperature of the fuel oil to be cleaned may be arranged upstream of the separator and upstream of the means for measuring the viscosity of the fuel oil to be cleaned.

The system may further comprise a bunker tank or the like for storing the fuel oil to be cleaned before being supplied to the centrifugal separator.

The system may also comprise an engine, such as a diesel engine, in which the clean oil phase from the separator is used.

DETAILED DESCRIPTION

The method and the system according to the present disclosure will be further illustrated by the following description with reference to the accompanying drawings.

Figure 1:
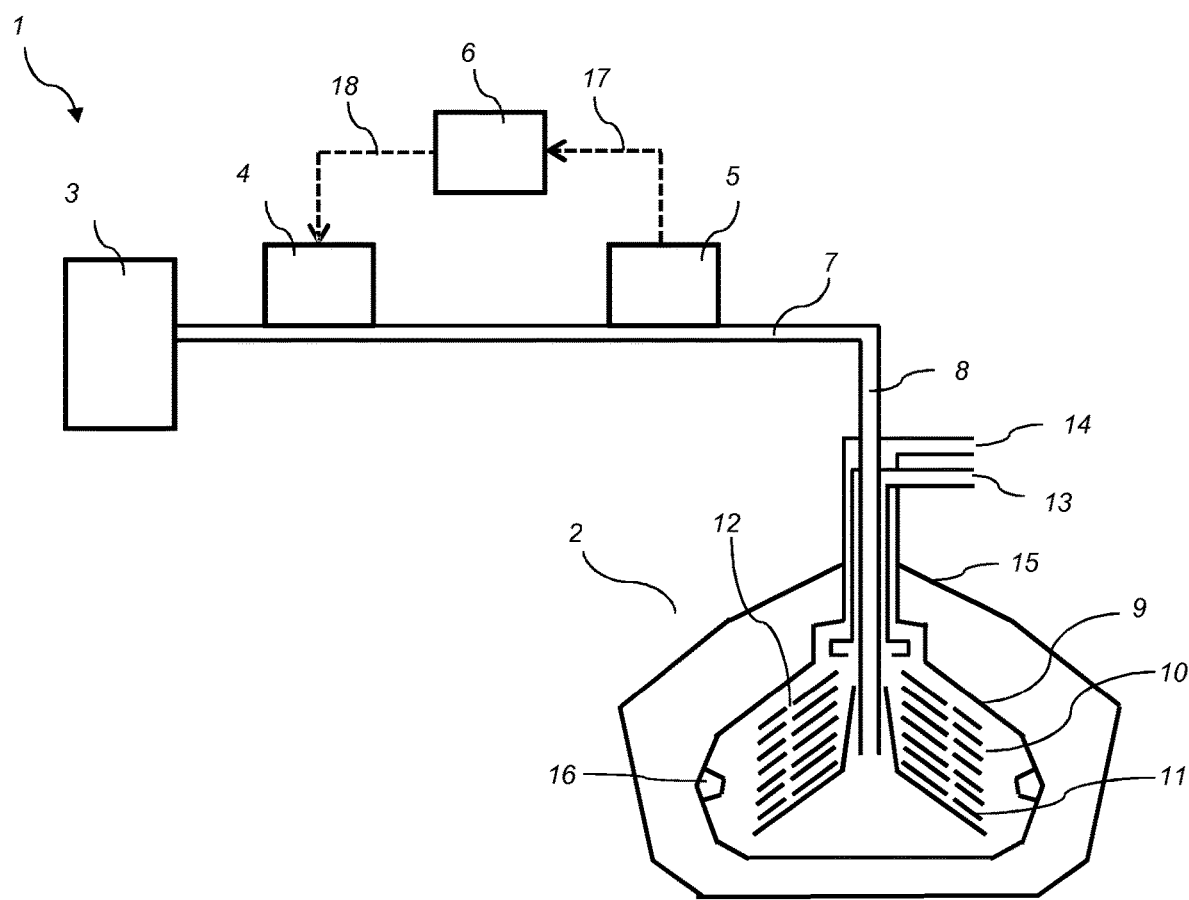
FIG. 1 shows a schematic drawing of an embodiment of a system of the present invention.

FIG. 1 shows a schematic drawing of an embodiment of a system 1 for cleaning fuel oil for a diesel engine. The system 1 comprises a centrifugal separator 2 in which different types of fuel oil, stored in bunker fuel oil tank 3, is cleaned. The fuel oil to be cleaned is supplied to the centrifugal separator 2 via piping 7, e.g. by means of a pump (not shown in FIG. 1), that is connected to inlet pipe 8 of the centrifugal separator 2. A viscosity meter 5 is arranged to measure the viscosity of the fuel oil to be cleaned in the piping 7 before it reaches the separator 2. The system further comprises a heater 4 for regulating the temperature of the fuel oil to be cleaned and a control unit 6 for regulating the heater 4. The control unit 6 is configured to regulate heater 4 based on received information of the viscosity of the fuel oil to be cleaned from the viscometer 5. In this example, the heater 4 is arranged upstream of the viscometer 5, but in other embodiments, the heater 4 may be arranged downstream of the viscometer 5.

The centrifugal separator 2 comprises a rotor 9 that forms within itself a separation chamber 10 in which centrifugal separation of the fuel oil takes place during operation.

The separation chamber 10 is provided with a stack of frusto-conical separation discs 11 in order to achieve effective separation of the fuel oil. The stack of truncated conical separation discs 11 are examples of surface-enlarging inserts. These discs 11 are fitted centrally and coaxially with the rotor and may comprise holes which form channels 12 for axial flow of liquid when the separation discs 11 are fitted in the centrifugal separator 2. The inlet pipe 8 forms a central duct, and is thus arranged for introducing the fuel oil for centrifugal separation in the separation chamber 10. The fuel oil is in this embodiment supplied from the top but also separators that are fed from the bottom may be used in the system.

The rotor 9 has extending from it a liquid light phase outlet 13 for a lower density component separated from the liquid, and a liquid heavy phase outlet 14 for a higher density component, or heavy phase, separated from the liquid. Light phase outlet 13 could thus be for discharging a clean oil phase and heavy phase outlet 14 could be for discharging a separated aqueous phase. The outlets 13 and 14 extend through the frame 15.

The rotor 9 is further provided at its outer periphery with a set of radially sludge outlets 16 in the form of intermittently openable outlets for discharge of higher density component such as sludge or other solids in the oil. This material is thus discharged from a radially outer portion of the separation chamber 10 to the space round the rotor. For example, a phase comprising catalyst fines could be discharged via outlets 16.

The centrifugal separator 1 is further provided with a drive motor (not shown) for rotating the rotor 9 at desired speed. During operation of the separator in FIG. 1, the rotor 9 is caused to be rotated by the drive motor. Via the inlet pipe 8, fuel oil to be separated is brought into the separation space 10. Depending on the density, different phases in the fuel oil is separated between the separation discs 11. Heavier component, such as a water phase and a sludge phase, move radially outwards between the separation discs, whereas the phase of lowest density, such as the clean oil phase, moves radially inwards between the separation discs and is forced through outlet 13 arranged at the radial innermost level in the separator. The liquid of higher density is instead forced out through outlet 14 that is at a radial distance that is larger than the radial level of outlet 13. Thus, during separation, an interphase between the liquid of lower density and the liquid of higher density is formed in the separation space 10. Solids, or sludge, accumulate at the periphery of the separation chamber 10 and is emptied intermittently from the separation space by the sludge outlets 16 being opened, whereupon sludge and a certain amount of fluid is discharged from the separation space by means of centrifugal force. However, the discharge of sludge may also take place continuously, in which case the sludge outlets 16 take the form of open nozzles and a certain flow of sludge and/or heavy phase is discharged continuously by means of centrifugal force.

In certain applications, the separator 1 only contains a single liquid outlet, such as only liquid outlet 13, and the sludge outlets 16. This depends on the fuel oil that is to be processed.

The fuel oil to be cleaned is supplied from bunker tank 3 and is in this embodiment initially heated to about 98° C. by heater 4. The viscosity of the fuel oil to be cleaned is measured by viscometer 5 and information is sent to control unit 6, as visualized by connection 17 in FIG. 1. The control unit 6 is configured to control the heater 4, as visualized by connection 18, so that the heater 4 may regulate the temperature of the fuel oil; either so that a limited number of temperatures can be obtained or so that a continuous change of temperature can be performed The control unit 6 may thus comprise a communication interface, such as a transmitter/receiver, via which it may receive data from the viscometer 5 and further transmit data to the heater 4. The transmitted data may for instance include a control signal for regulating the heater 4.

In this embodiment, the control unit 6 is further configured regulate the temperature so that the viscosity of the fuel oil is maintained at a constant level, $v_{set}$, of about 35 cSt. If the measured viscosity from viscometer 5 indicates that the viscosity of the fuel oil to be cleaned is above 35 cSt, the control unit is configured to increase the temperature of heater 4 until the measured viscosity decreased to 35 cSt. For example, the temperature of the fuel oil to be cleaned could be around 98° C., and the control unit 6 could induce heating of the oil up to e.g. 115° C. until the measured viscosity from viscometer 5 is decreased to 35 cSt.

In analogy, if the measured viscosity from viscometer 5 later indicates that the viscosity of the fuel oil to be cleaned is below 35 cSt, the control unit is configured to decrease the temperature of heater 4 until the measured viscosity decreased to 35 cSt. Thus, the temperature of the fuel oil to be cleaned could be decreased from 115° C. to 98° C. until the measured viscosity from viscometer 5 is increased to 35 cSt. In this way, a separation temperature of above 98° C. is only used when necessary, i.e. when the viscosity of the oil is above a certain reference value (setpoint), which means that separator parts may be less worn out. This means that the separation of the fuel oil is performed at a more or less constant viscosity by regulating the temperature of the fuel oil to be cleaned.

The above type of regulation could be performed continuously, i.e. the control unit could have a built-in regulation loop that continuously regulated the temperature so that the viscosity is at the reference value, $v_{set}$, or the regulation could be performed intermittently, i.e. at a specific frequency.

For the purpose of regulating, the control unit 6 may comprise a processing unit, such as a central processing unit, which is configured to execute computer code instructions which for instance may be stored on a memory. The memory may thus form a (non-transitory) computer-readable medium for storing such computer code instructions. The processing unit may alternatively be in the form of a hardware component, such as an application specific integrated circuit, a field-programmable gate array or the like.

Figure 2:
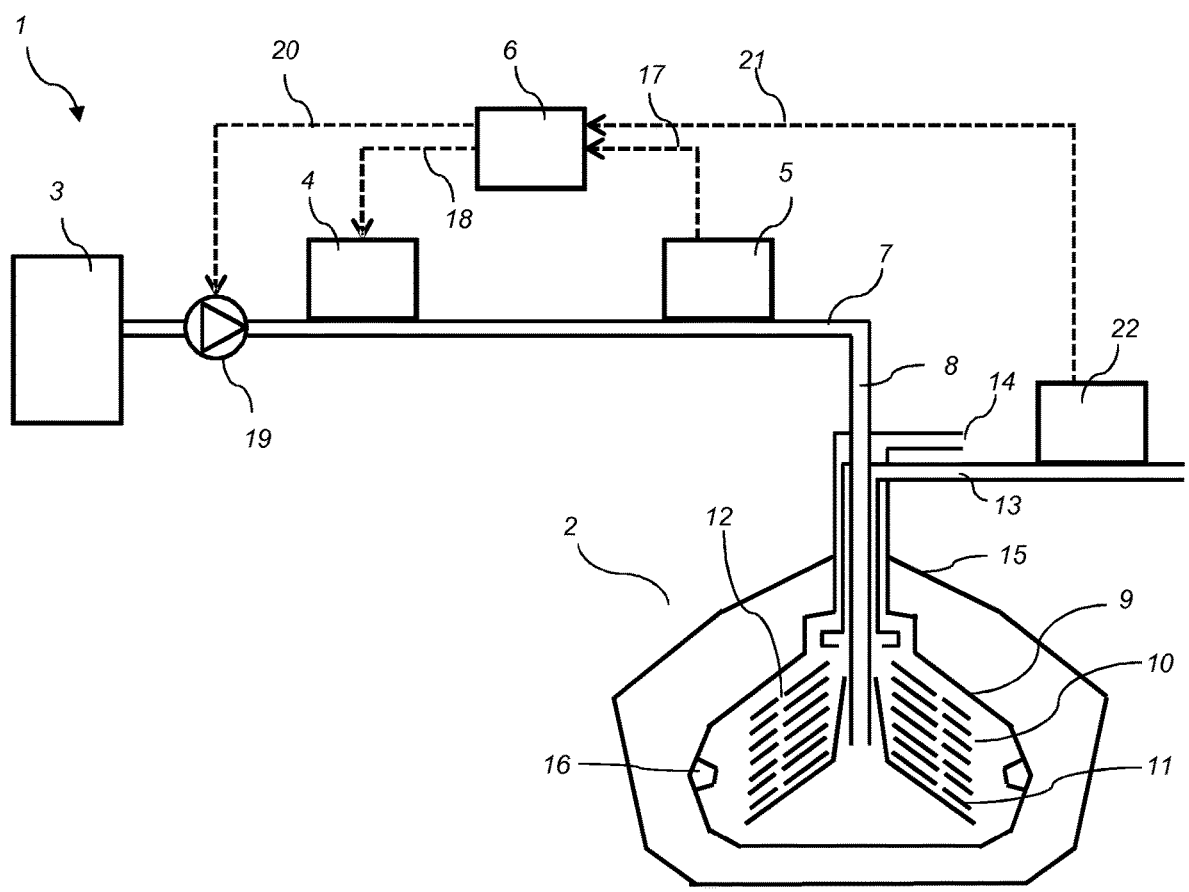
FIG. 2 shows a schematic drawing of a further embodiment of a system of the present invention.

FIG. 2 shows a schematic drawing of another embodiment of a system 1 for cleaning fuel oil for a diesel engine. The parts of this system 1 function as discussed in relation to the system of FIG. 1. However, the system 1 as shown in FIG. 2 further comprises a pump 19 for supplying the fuel oil to be cleaned from tank 3 to separator 2 and the control unit 6 is further configured for controlling the pump, as visualized by arrow 20 in FIG. 2. The control unit 6 may thus also regulate the flow rate of the fuel oil that is to be cleaned in addition to regulating the temperature based on information from viscometer 5. The flow rate is in this example regulated based on information from a sensor 22 for detecting a parameter related to the concentration of catalyst fines, or the concentration of catalyst fines itself, as indicated by arrow 21 in FIG. 2. This sensor 22 is in FIG. 2 arranged to measure the concentration of catalyst fines in the clean oil phase, i.e. downstream of light phase outlet 13. However, sensor 22 could also be arranged to measure the concentration of catalyst fines in the fuel oil to be cleaned, e.g. arranged to measure the concentration of catalyst fines in line 7, e.g. downstream of viscometer 5. Further, a system could comprise more than one sensor 22 for measuring the concentration of catalyst fines, such as a sensor 22 as shown in FIG. 2, i.e. arranged to measure the concentration of catalyst fines in the clean oil phase, and an additional sensor arranged to measure the concentration of catalyst fines in the fuel oil to be cleaned. The control unit 6 could then be configured to take both measurements in account when regulating the flow rate of the fuel oil to be cleaned by means of pump 19.

As an example, control unit 6 may receive information from viscometer 5 that the viscosity of the fuel oil to be cleaned is increasing and may then increase the temperature of the oil using the heater 4, or decrease the temperature of the oil if the viscosity is decreasing, as discussed in relation to the embodiment of FIG. 1 above.

Further, the control unit 6 may receive information from sensor 22 that the concentration of catalyst fines in the cleaned oil phase is increasing and may then decrease the flow rate of the fuel oil to be cleaned using pump 19. In, analogy, the control unit 6 may receive information from sensor 22 that the concentration of catalyst fines in the cleaned oil phase is decreasing and may then again increase the flow rate of the fuel oil to be cleaned using pump 19.

Figure 3:
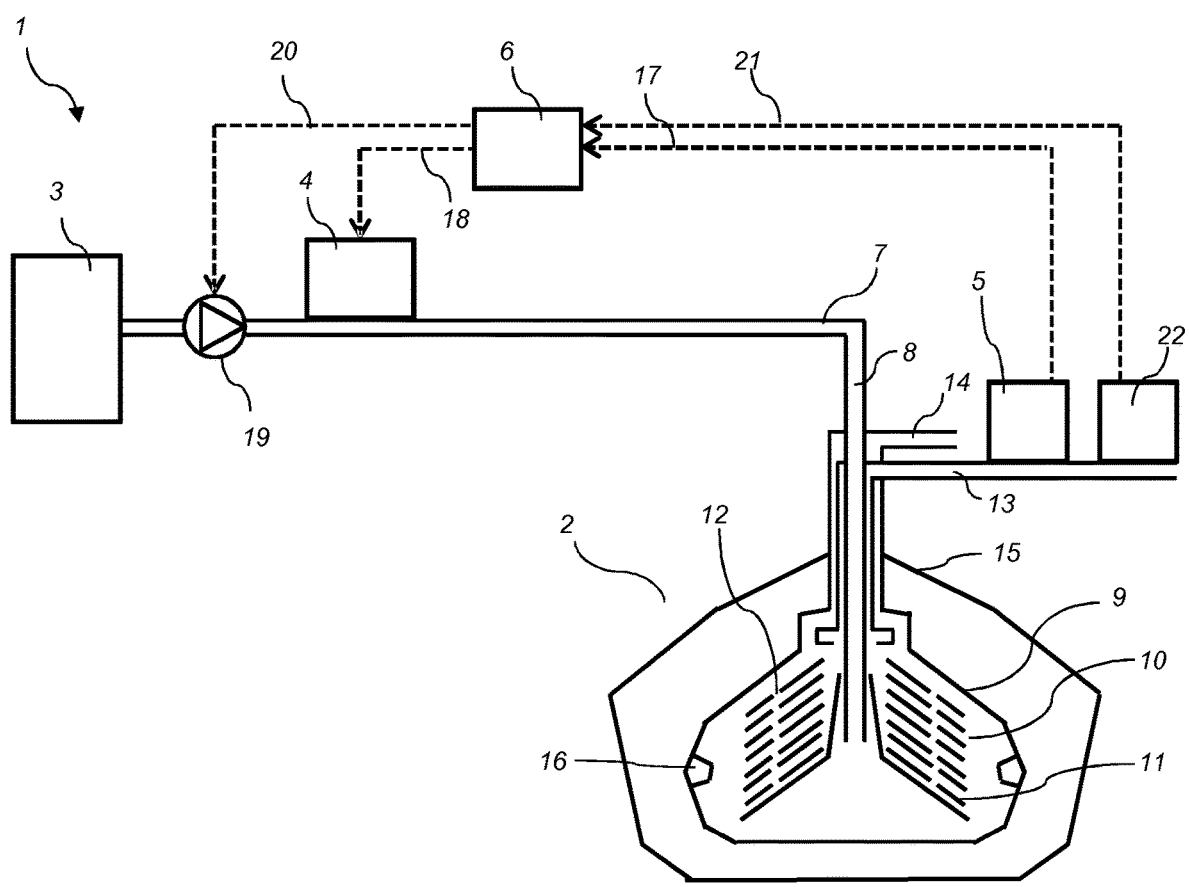
FIG. 3 shows a schematic drawing of an embodiment of a system of the present invention.

FIG. 3 shows a schematic drawing of another embodiment of a system 1 for cleaning fuel oil for a diesel engine. The parts of this system 1 function as discussed in relation to the system of FIG. 2. However, in the system 1 as shown in FIG. 3, the viscometer is arranged to measure the viscosity downstream of the separator 2, and control unit is configured for receiving information from the viscometer, as indicated by arrow 21 in FIG. 3. The viscometer 3 could for example be arranged at the oil outlet, which is the light phase outlet 13, or in a pipe connected to the oil outlet. The viscometer 5 could be connected anywhere between the separator and e.g. an engine to which system 1 is connected, i.e. an engine that is about to use the oil cleaned by separator 2. Regulation of temperature and flow rate of the fuel oil to be cleaned by control unit 6 based on information from viscometer 5 and sensor 22 may function as discussed in relation to the embodiments discussed in relation to FIGS. 1 and 2 above.

Figure 4:
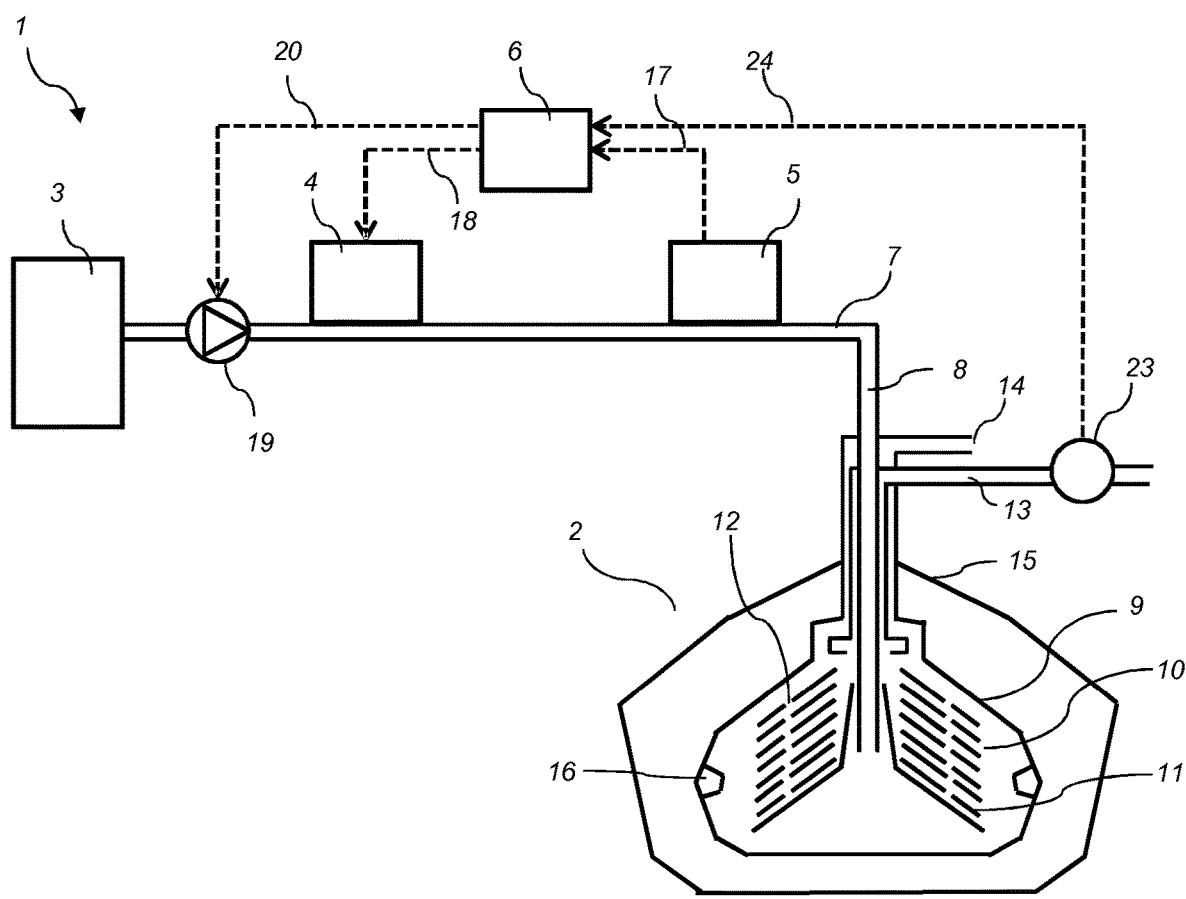
FIG. 4 shows a schematic drawing of a further embodiment of a system of the present invention.

FIG. 4 shows a schematic drawing of another embodiment of a system 1 for cleaning fuel oil for a diesel engine. The parts of this system 1 function as discussed in relation to the system of FIG. 2. However, in the system 1 as shown in FIG. 4, the control unit 6 regulates the flow rate of the fuel oil to be cleaned based on information from a flow meter 23 arranged downstream of the centrifugal separator 2, as indicated by arrow 24 in FIG. 4. The flow meter 23 is arranged in the system to measure the flow rate of fuel that enters an engine (not shown) that uses the clean oil phase as a fuel, which is thus a direct indication of the engine workload. As an example, control unit 6 may receive information from flow meter 23 that the flow rate of oil to the engine is increasing and may then increase the flow rate of the fuel oil to be cleaned using pump 19. In, analogy, the control unit 6 may receive information from flow meter 23 that the flow rate of oil to the engine is decreasing and may then again decrease the flow rate of the fuel oil to be cleaned using pump 19. In this way, the flow rate of the fuel oil to be cleaned may be varied depending on the actual workload of the engine, meaning that if the workload is low, the flow rate of fuel oil to be cleaned may be decreased so that a more effective separation may take place in separator 2. Thus, the system 1 allows for an effective use of separator 2 when the demand for clean oil is lower, i.e. when the workload of the engine is lower.

Further, the regulation of the temperature of the fuel oil to be cleaned by control unit 6 based on information from viscometer 5 may function as discussed in relation to the previous embodiments as discussed in relation to FIGS. 1-3 above.

Further, the system 1 of FIG. 4 may comprise other equipment between the outlet for clean oil, i.e. liquid light phase outlet 13, and flow meter 23, such as a tank etc. for storing the clean oil phase before it is used by an engine. Thus, the flow meter 23 may be arranged downstream such a tank but before the engine so that it measures the flow of oil that actually enters the engine.

The invention is not limited to the embodiment disclosed but may be varied and modified within the scope of the claims set out below. The invention is not limited to the type of separator as shown in the Figures. The term "centrifugal separator" also comprises centrifugal separators with a substantially horizontally oriented axis of rotation and separator having a single liquid outlet.

The invention claimed is:

1. A method for cleaning fuel oil for a diesel engine comprising the steps of:
    providing a fuel oil to be cleaned;
    supplying said fuel oil to be cleaned to a centrifugal separator;
    cleaning said fuel oil to be cleaned in the centrifugal separator to provide a clean oil phase;
    measuring a viscosity of the fuel oil to be cleaned before cleaning in said centrifugal separator or a viscosity of the clean oil phase; and
    regulating a temperature of the fuel oil to be cleaned based on said measured viscosity,
    wherein the step of regulating the temperature of the fuel oil to be cleaned comprises:
    comparing the measured viscosity to a setpoint viscosity value $v_{set}$;
    determining that the measured viscosity is lower than the setpoint viscosity value $v_{set}$; and
    decreasing the temperature of the fuel oil to be cleaned based on the measured viscosity.

2. The method according to claim 1, wherein the viscosity of the fuel oil to be cleaned is measured before cleaning in said centrifugal separator.

3. The method according to claim 1, wherein the step of regulating the temperature of the fuel oil to be cleaned further comprises changing the temperature of the fuel oil to be cleaned so that the viscosity of the fuel oil to be cleaned is kept below a specific maximum viscosity $v_{max}$.

4. The method according to claim 3, wherein the specific maximum viscosity $v_{max}$ is 55 cSt.

5. The method according to claim 3, wherein the viscosity of the fuel oil to be cleaned is kept at a setpoint viscosity value $v_{set}$ that is below said specific maximum viscosity $v_{max}$ or within a specific viscosity interval that is below said specific maximum viscosity $v_{max}$.

6. The method according to claim 5, wherein the specific viscosity interval is between 25-45 cSt.

7. The method according to claim 5, wherein the step of regulating the temperature of the fuel oil to be cleaned further comprises comparing the measured viscosity to the setpoint viscosity value $v_{set}$ and increasing the temperature of the fuel oil to be cleaned if the measured viscosity is higher than the setpoint viscosity value $v_{set}$.

8. The method according to claim 1, wherein the step of regulating the temperature of the fuel oil to be cleaned comprises regulating the temperature of the fuel oil to be cleaned to temperatures above 98° C.

9. The method according to claim 1, wherein the step of regulating the temperature of the fuel oil to be cleaned further comprises changing the temperature of the fuel oil to be cleaned to values between a lowest temperature $t_{low}$ and a maximum limit temperature $t_{max}$, wherein the lowest temperature $t_{low}$ is between 95° C. and 98° C., and the maximum limit temperature $t_{max}$ is above 105° C.

10. The method according to claim 1, further comprising a step of regulating a flow rate of the fuel oil to be cleaned.

11. The method according to claim 10, wherein the step of regulating the flow rate of the fuel oil to be cleaned depends on the workload of the diesel engine in which the clean oil phase is used.

12. The method according to claim 1, wherein the step of measuring the viscosity of the fuel oil to be cleaned before cleaning in said centrifugal separator or the viscosity of the clean oil phase is measuring the viscosity of the clean oil phase.

13. The method according to claim 10, wherein the step of regulating the flow rate of the fuel oil to be cleaned comprises regulating a pump.

14. The method according to claim 10, wherein the step of regulating the flow rate of the fuel oil to be cleaned depends on the measured viscosity.

15. A system for cleaning fuel oil for a diesel engine comprising:
    a centrifugal separator for separating impurities from a fuel oil to be cleaned for a diesel engine and for generating a cleaned oil phase;
    at least one instrument for measuring a viscosity of the fuel oil to be cleaned or the viscosity of the cleaned oil phase;
    a temperature regulator configured to regulate a temperature of the fuel oil to be cleaned; and
    a control unit configured for;
    receiving information of the measured viscosity from said at least one instrument for measuring the viscosity;
    comparing the measured viscosity to a setpoint viscosity value $v_{set}$;
    determining that the measured viscosity is lower than the setpoint viscosity value $v_{set}$;
    decreasing the temperature of the fuel oil to be cleaned based on the measured viscosity; and
    generating an output signal to the temperature regulator based on the received information of the measured viscosity.

16. The system according to claim 15, further comprising a pump for regulating a flow rate of the fuel oil to be cleaned and wherein the control unit is further configured for generating an output signal to the pump for regulating the flow rate of the fuel oil to be cleaned.

17. The system according to claim 16, wherein the system further comprises a flow meter arranged downstream of said centrifugal separator for measuring a flow rate of a cleaned oil phase, and wherein the control unit is configured to regulate the flow rate of the fuel oil to be cleaned based on information from said flow meter.

18. The system according to claim 15, wherein the system comprises at least one instrument for measuring the viscosity of the fuel oil to be cleaned and said instrument is arranged downstream of the temperature regulator.

19. The system according to claim 15, wherein the temperature regulator is a heater.

* * * * *